Patented June 13, 1944

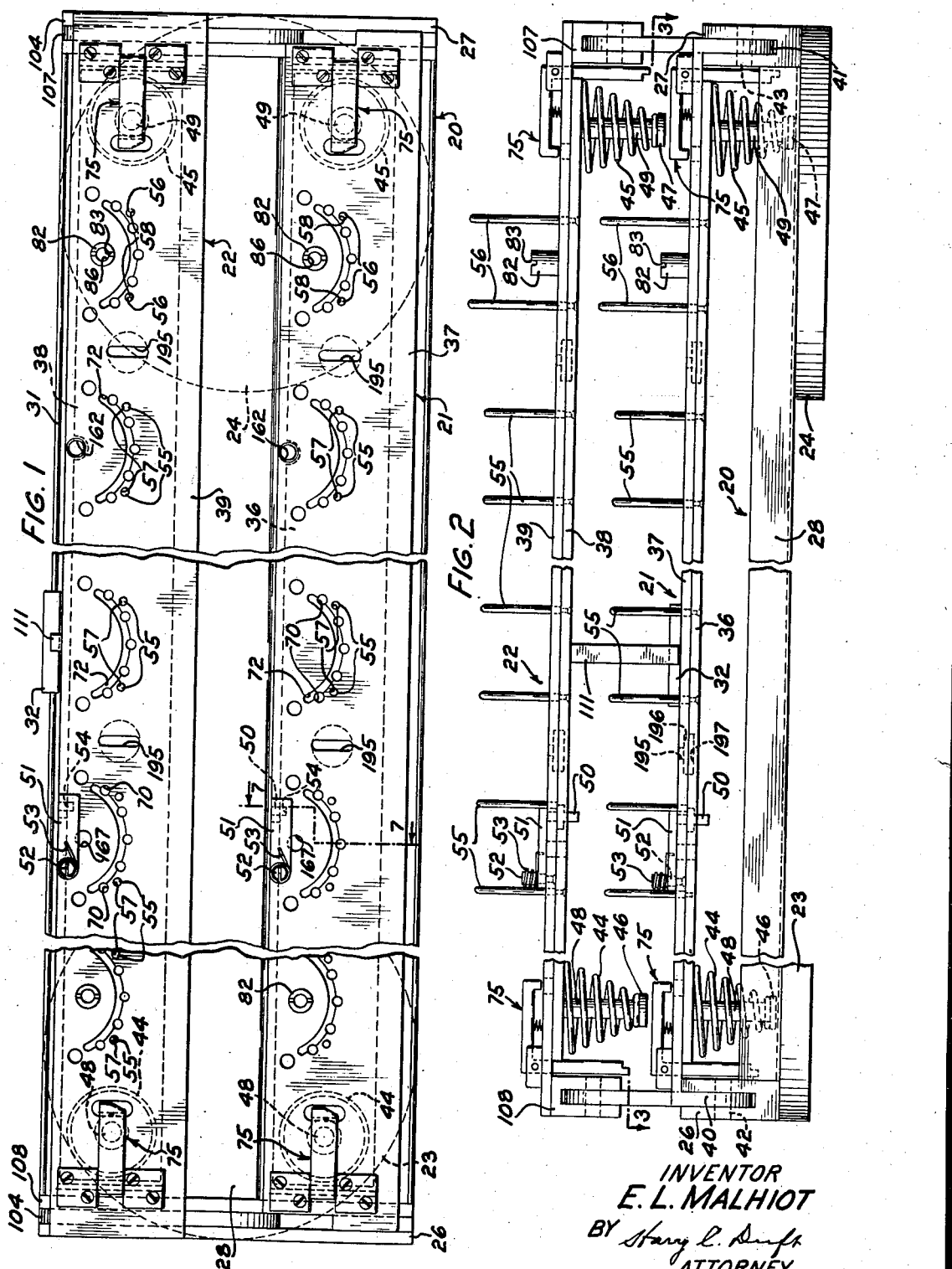

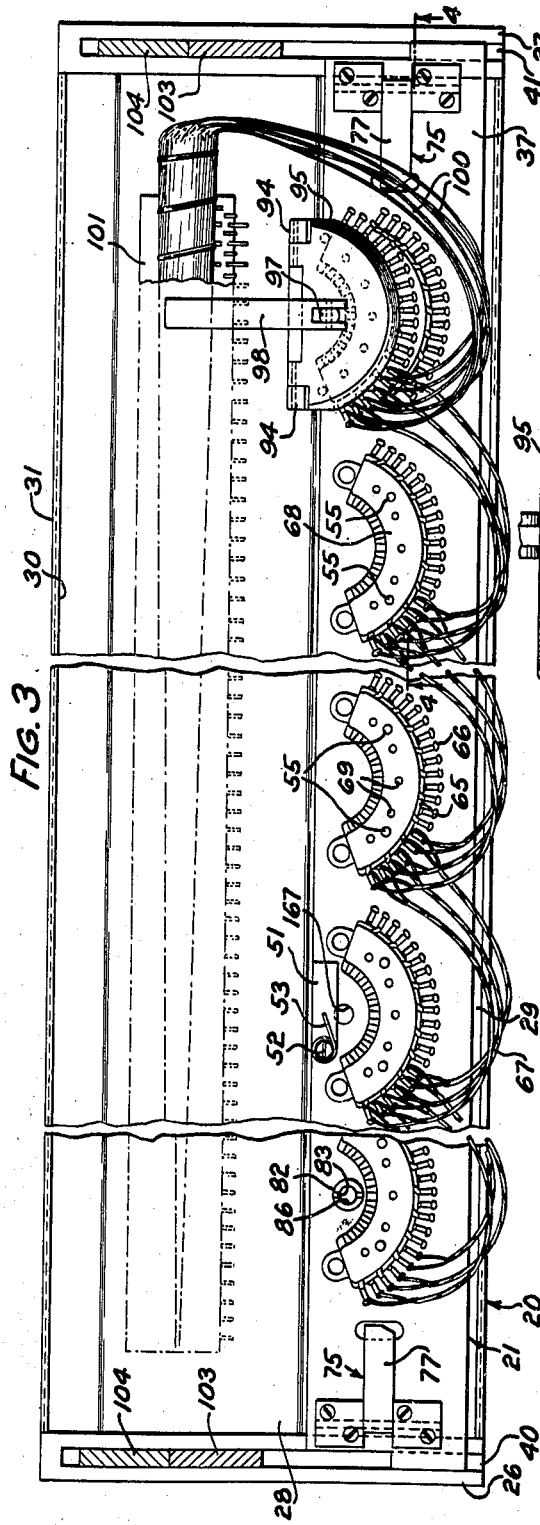
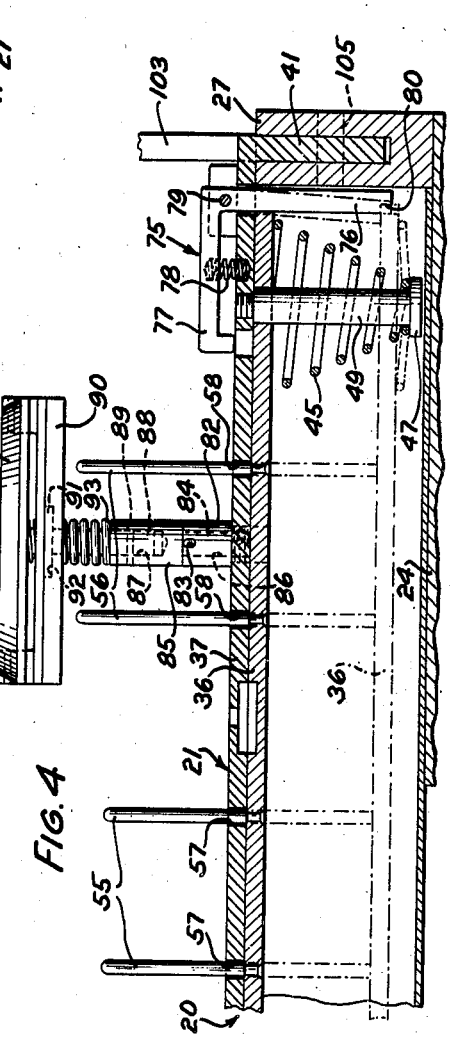
FIG. 3
FIG. 4
INVENTOR
E. L. MALHIOT
BY Harry L. Duft
ATTORNEY

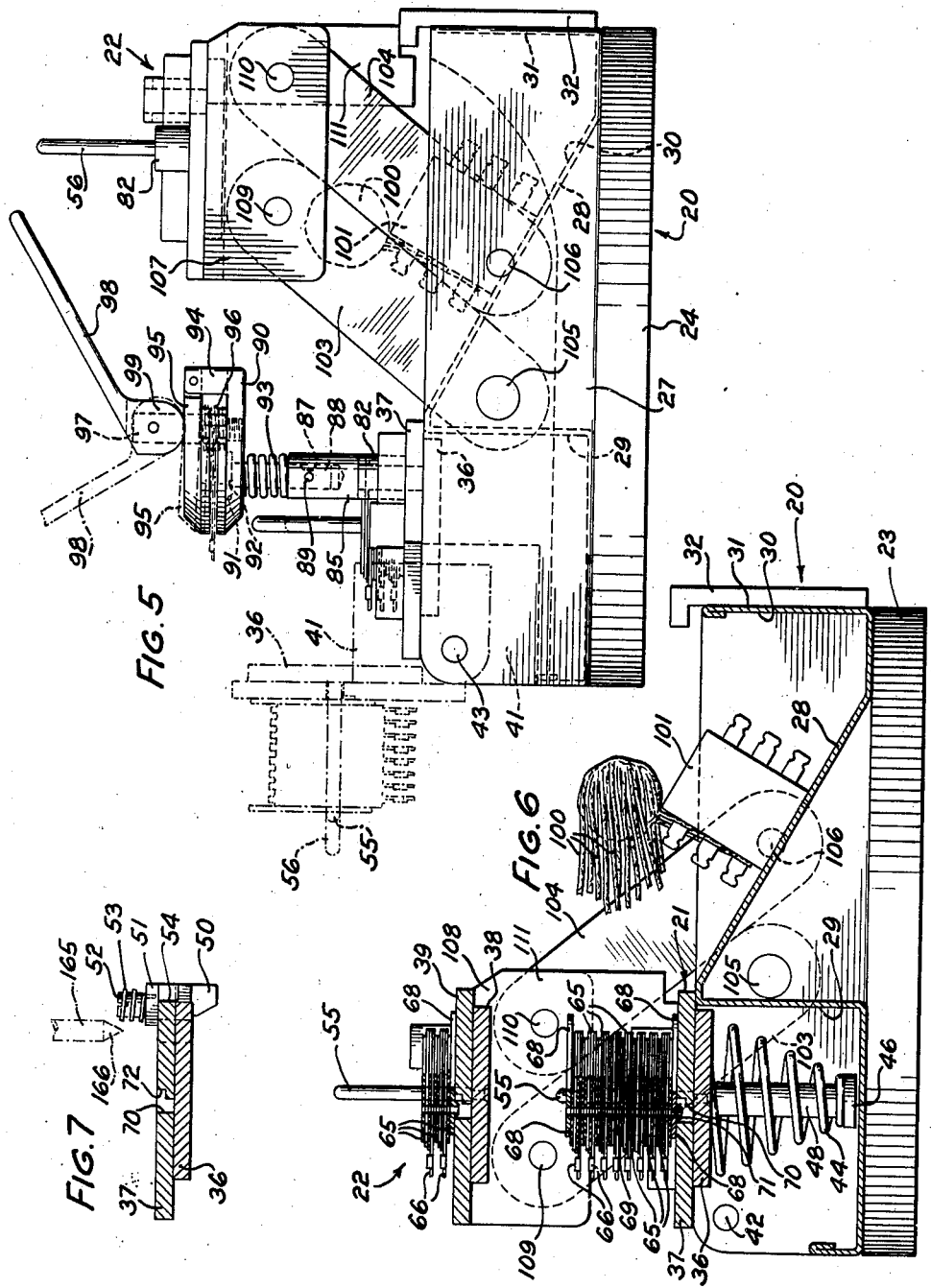

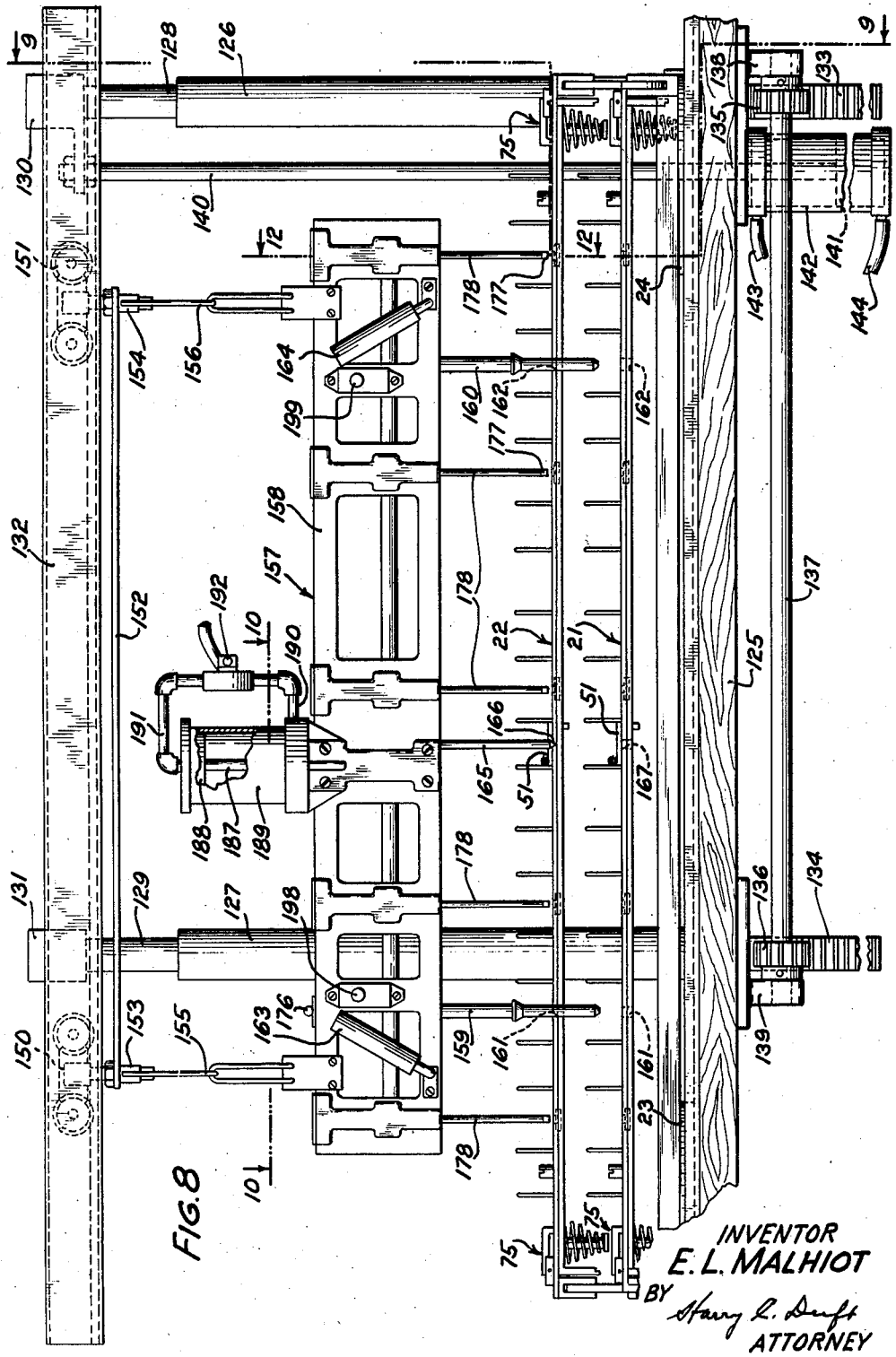

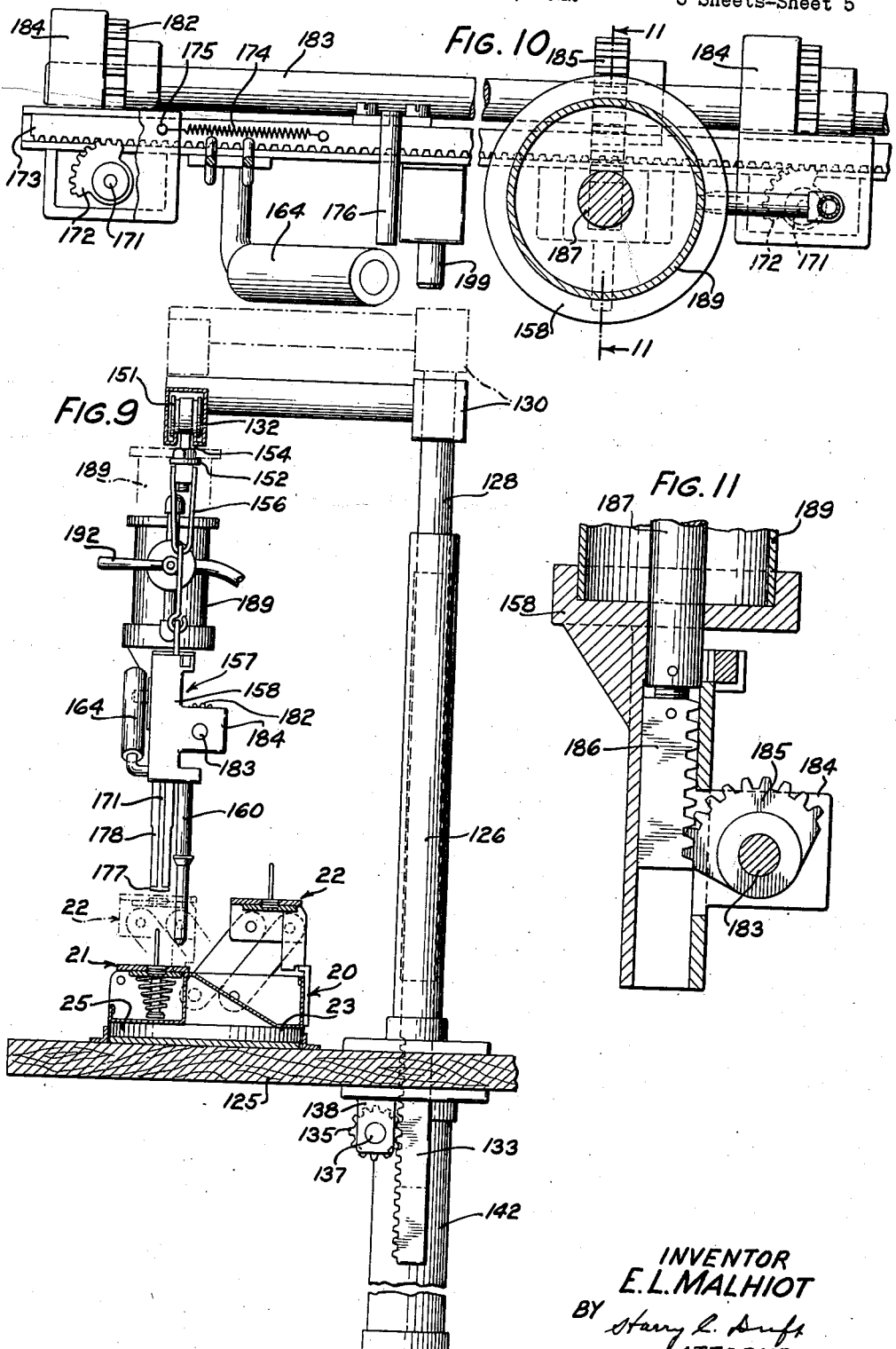

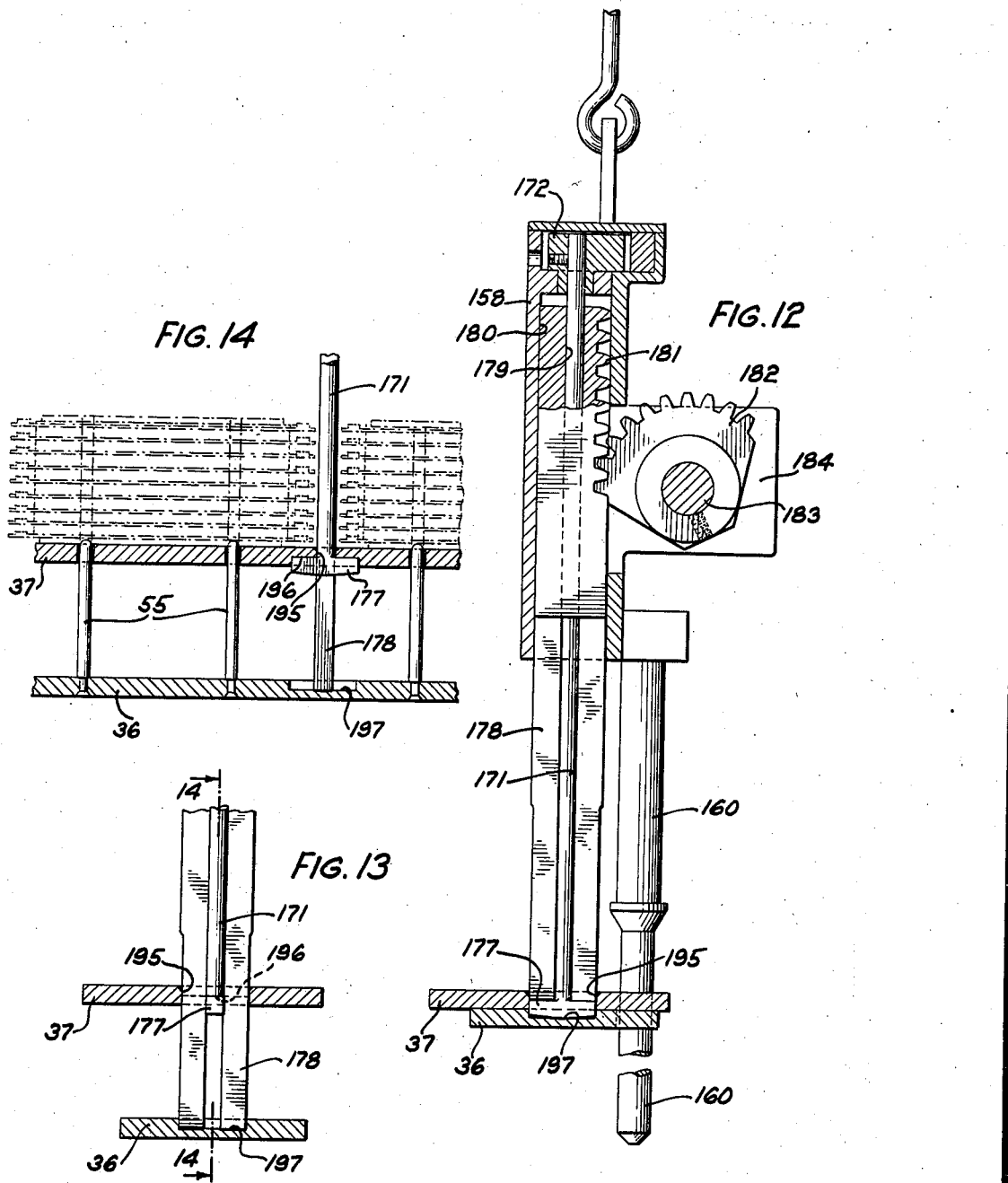

2,351,276

UNITED STATES PATENT OFFICE 2,351,276

ARTICLE ASSEMBLING APPARATUS

Eugene L. Malhiot, Maywood, Ill., assignor to Western Electric Company, Incorporated, New York, N. Y., a corporation of New York Application November 17, 1942, Serial No. 465,940

13 Claims. (Cl. 29—84)

This invention relates to an article assembling apparatus and more particularly to an assembling fixture and apparatus for stripping assembled articles from said fixture.

It is an object of the present invention to provide a simple apparatus for expeditiously assembling articles.

In accordance with one embodiment of the invention, an apparatus is provided for assembling parts of step by step bank equipment, including a fixture on which the parts may be assembled and apparatus for stripping the parts from the fixture after they have been assembled together. The fixture on which the parts are to be assembled comprises two sets of assembling plates, one of which is mounted on a pantograph arrangement so that it may be moved to and from position above the other level. The assembling plates each have a stripper plate associated with it and a series of pins extend through the stripper plates and are fixed in the assembling plates whereby, after parts are assembled on the plates and fixed together in any suitable manner, the assembled parts may be stripped from the assembling plates by a stripper mechanism mounted for movement vertically to engage the assembly and stripper plates and for movement with the assembling fixture as it travels along on a conveyor.

A better understanding of the invention will be had by reference to the following detailed description of the preferred embodiment of the invention when considered in conjunction with the accompanying drawings, wherein Fig. 1 is a plan view of an assembling fixture made in accordance with the present invention;

Fig. 2 is a front elevational view of the apparatus shown in Fig. 1;

Fig. 3 is an enlarged sectional view taken substantially along the line 3—3 of Fig. 2 in the direction of the arrows and showing some parts positioned on the fixture;

Fig. 4 is an enlarged longitudinal sectional view taken substantially along the line 4—4 of Fig. 3 in the direction of the arrows with no parts on the fixture;

Fig. 5 is a right end elevational view of the structure on an enlarged scale shown in Fig. 1;

Fig. 6 is a transverse vertical sectional view taken through the fixture showing one of the assembling plates moved to position directly above the other assembling plate and showing some of the assembled parts in position in the apparatus;

Fig. 7 is a fragmentary transverse vertical sectional view taken substantially along the line 7—7 of Fig. 1 in the direction of the arrows;

Fig. 8 is a front elevational view of the stripping mechanism for stripping parts from the fixture;

Fig. 9 is a vertical sectional view taken substantially along the line 9—9 of Fig. 8 in the direction of the arrows showing most of the stripping mechanism in end elevation.

Fig. 10 is a fragmentary horizontal sectional view taken substantially along the line 10—10 of Fig. 8 in the direction of the arrows showing part of the actuating mechanism for the stripping apparatus;

Fig. 11 is a fragmentary detail sectional view taken substantially along the line 11—11 of Fig. 10 in the direction of the arrows;

Fig. 12 is an enlarged vertical sectional view taken substantially along the line 12—12 of Fig. 8 in the direction of the arrows;

Fig. 13 is a fragmentary sectional view similar to the bottom portion of Fig. 12, but showing parts of the stripping mechanism in operative position; and Fig. 14 is a vertical sectional view taken substantially along the line 14—14 of Fig. 13, also showing parts of the stripping mechanism in their operative position and, in addition, showing parts of the assembled apparatus in dot and dash lines and in the position which it occupies after the stripping mechanism has been operated.

By reference to the drawings, particularly to Figs. 1 to 7, it will be seen that the assembling fixture comprises a carrier 20, which supports two cooperating assembling sections 21 and 22. The carrier 20 is provided with feet 23 and 24 which ride on a conveyor belt 25 (Figs. 8 and 9). Suitably fixed to the feet 23 and 24 are a pair of channelled members 26 and 27, respectively, which form the ends of the carrier 20. Extending between the channeled members 26 and 27 is an irregularly shaped sheet of metal 28, which is bent to form two pockets 29 and 30 (Figs. 5 and 6) which extend throughout the length of the carrier 20. A portion 31 of the sheet 28 is bent into a vertical plane for forming one of the side walls of the pocket 30 and to this portion 31 there is fixed a bracket 32, the purpose of which will become apparent as the description progresses.

The assembly sections 21 and 22 are of the same construction and comprise pin supporting plates 36 and 37, the stripper plates 38 and 39, respectively. In the assembling section 21, the plate 37 is suitably attached, for example, by welding it to a pair of support levers 40 and 41, which are positioned in the channel of the channelled members 26 and 27, respectively and are pivotally mounted on pins 42 and 43 so that the pin supporting plate 36 may be rocked from the position shown in full lines in Fig. 6 to the position shown in dot and dash lines in Fig. 5. The plate 36 is suspended on the underside of the plate 37 by means of springs 44 and 45, which are interposed between the underside of the plate 36 and shoulders 46 and 47 formed on pins 48 and 49 secured to the plate 37.

When the plate 36 is in the position shown in Fig. 2, it is supported adjacent its mid portion by a latch 50, which is formed on the underside of a lever 51 and engages the underside of the plate 36. The lever 51 is mounted upon a pin 52 fixed in the plate 37 and is normally urged to move the latch 50 under the plate 36 by a coil spring 53, which is fixed to the pin 52 and engages the lever 51. The plate 37 is cut out as shown at 54 to permit the latch 50 to move in under the plate 36. In this manner, the plate 36 is prevented from sagging away from the plate 37 at the center of the plates and will hold a series of positioning pins 55—55 and 56—56, which are fixed in the plate 36 and extend through suitable apertures 57—57 and 58—58 in the plate 37 in their upper position, as shown in Fig. 2. When the pins 55 and 56 are in the position shown in Figs. 2, 4, 5 and 6, parts may be assembled on them in a manner illustrated most clearly in Fig. 6.

The parts to be assembled in the apparatus constituting the present embodiment of the invention are step by step bank subassemblies, which, in a previous operation, have been interconnected in a manner illustrated in Fig. 3, wherein the completely assembled banks are shown. These banks comprise a plurality of superposed insulators 65 having conducting members 66 attached to them which have, in a previous operation, been interconnected by means of insulated wires 67 to form a strip of interconnected bank levels which are to be assembled in the present apparatus. In the assembling operations, the pileup of insulators 65 with their attached conducting members 66 interconnected by the insulated wires 67 are to be attached together by placing holding plates 68—68 on each side of the pileup and passing bolts through aligned apertures formed in the top plate 68 and insulators 65 as indicated by the continuous passage 69 (Fig. 6). The apertures in the lower plates 68 are threaded to receive the bolts which may be passed through the passages 69 and threaded into the lower plate 68. The stripper plate 37 has a series of holes 70 formed in it for receiving an embossed portion 71 of the plate 68 which is threaded to receive the assembling bolt and, in addition, the plate 37 is provided with arcuately shaped slots 72, into which a strengthening embossing on the plate 68 may extend.

After an assembly has been assembled on the plate 37, it will be compressed in any suitable manner while the bolts are threaded into the lower holding plate 68. After the parts of the assemblies have thus been attached together, it is necessary to strip them off the positioning pins 55 and 56 and the apparatus to be described hereinafter for performing this operation will move the plate 36 downwardly with respect to the plate 37, thereby to compress the springs 44 and 45. When the plate 36 is moved downwardly to the position shown in dot and dash lines in Fig. 4, it will be latched in its downward position by a spring pressed latch 75, which is L-shaped in configuration and has a latching portion 76 and a handle portion 77. Interposed between the handle portion 77 and the plate 37 is a compression spring 78 for normally urging the latch 75 to rock in a clockwise direction about a pivot pin 79. The lower end of the latch portion 76 has a notch 80 cut in it for engaging the top surface of the plate 36 when the plate 36 is moved downwardly with respect to the plate 37. After the assembled parts have been removed from the assembling section 21, the handle portion 77 of the spring pressed latch 75 may be pushed downwardly to release the plate 36 and to permit the plate to move upwardly under the action of the springs 44 and 45. There is a spring-pressed latch 75 provided at each end of the assembling section and each of them is of exactly the same construction.

In addition to the mechanisms described hereinbefore as being supported by or associated with the assembling section 21, there is provided on the plate 37 a stud 82 having a slot 83 formed in its upper surface. The stud 82 extends upwardly from the plate 37 and is adapted to receive a reduced portion 84 (Fig. 4) of a post 85 within a central aperture 86 formed in the stud 82. There are two of the studs 82 provided on each plate 37 and these studs are adjacent opposite ends of the plate since the post 85, which they are to receive, supports a fixture adapted to hold parts of the apparatus being assembled during the soldering of leads to that particular part of the apparatus. The post 85 has a socket 87 formed in it for receiving a stud shaft 88, which is pinned in the socket 87 by means of a pin 89 and which rotatably supports a plate 90. A head portion 91 on the stud shaft 88 engages a shoulder 92 formed in the plate 90 and a spring 93 is interposed between the upper end of the post 85 and the undersurface of the plate 90 so that while the plate 90 may be rotated with respect to the stud shaft 88, the spring 93 tends to lock the plate 90 in any rotative position. Upwardly extending portions 94 of the plate 90 have hinged to them a clamping plate 95 and interposed between the plate 90 and clamping plate 95 is a spring 96, which normally urges the plate 95 to rock clockwise with respect to the plate 90. Fixed in the plate 90 and extending upwardly through the plate 95 is a post 97 having pinned to it a lever 98, on the end of which there is formed an eccentric 99. When the eccentric 99 is rocked to the position shown in full lines (Fig. 5), it will rock the plate 95 counter-clockwise against the action of the spring 96 to clamp an insulator 65 and its attached conducting members 66 in position, where leads 100 may be soldered to the terminals of the conducting members 66. The leads 100 (Fig. 3) extend to a terminal strip 101, which may be positioned in the pocket 30 provided for this purpose on the carrier 20. One insulator 65, and its attached conductor members 66, at a time, may be placed between the plate 90 and clamping plate 95 while the leads from the terminal strip 101 are attached to it and the insulator 65 may then be placed on the locating or positioning pins 56. Since the terminal strip 101 may have its leads 100 extending from it at either end of the strip, the post 85 may be moved to either of the studs 82, depending upon the end of the terminal strip 101 from which the leads 100 extends.

The assembling section 22 is exactly the same as the assembling section 21 except for the fact that while the assembling section 21 may be rocked from the position shown in full lines in Fig. 5 to the position shown in dot and dash lines in that figure, the assembling section 22 may be moved from the position shown in full lines in Fig. 5 to the position shown in full lines in Fig. 6. Accordingly, a pantograph arrangement is provided for supporting the assembling section 22. This pantograph arrangement comprises two levers 103 and 104 set into the channel of each of the channeled members 26 and 27 and pivoted therein by means of pivot pins 105 and 106, respectively. In addition to being pivoted in the channel members 26 and 27, the levers 103 and 104 extend upwardly into channel members 107 and 108 welded to the plate 39 at opposite ends thereof and the levers 103 and 104 are pivotally connected in the channel members 107 and 108 by means of pivot pins 109 and 110, respectively. Attached to the plate 39 adjacent the center thereof is a downwardly extending stop member 111, which will engage the bracket 32 when the assembly 22 is in the position shown in Fig. 5 and which will engage the top surface of the plate 37 when the assembling section 22 is in the position shown in Fig. 6.

The carrier 20 is designed to be used in connection with conveyor systems including the belt 25 by means of which the carrier will be carried in a continuous path past a series of operator stations (not shown) where the various parts to be assembled will be placed on the assembling sections 21 and 22. After the parts have been assembled on the assembling sections 21 and 22 and bolted together, it is necessary to strip the parts from the positioning pins 55 and 56 and, accordingly, there is provided an apparatus for performing this operation, which apparatus is positioned adjacent the conveyor belt 25 and comprises the mechanisms shown in Figs. 8 to 14, inclusive. In Figs. 8 and 9, the conveyor belt 25 is shown travelling along the upper surface of a table 125, on which there are mounted a pair of hollow standards 126 and 127 (Fig. 8). Slidable in the hollow standards 126 and 127 are a pair of guide plungers 128 and 129 having mounted at their upper ends brackets 130 and 131, which support a track 132. The lower ends of the plungers 128 and 129 have racks 133 and 134, respectively, attached to them for cooperation with spur gears 135 and 136 mounted upon a shaft 137. The plungers 128 and 129 thus must move upwardly or downwardly at the same time due to the fact that the racks on the lower ends of them are in mesh with the spur gears 135 and 136 fixed to the shaft 137. The shaft 137 is journalled in suitable bearings 138 and 139 secured to the underside of the table 125. A piston rod 140 is suitably attached to the bracket 130 and carries a piston 141 on its lower end in a cylinder 142. The cylinder 142 may be supplied with fluid under pressure through a hose connection 143 or a hose connection 144 connected to its upper and lower ends, respectively, whereby the piston rod 140 may have reciprocation imparted to it by supplying fluid from a suitable source (not shown) through the hose connection 143 and 144. When fluid under pressure is admitted to the lower end of the cylinder 142, the piston rod 140 will be moved upwardly and will carry the track 132 upwardly with it, the track maintaining a parallel relation with the table 125 due to the connection between the guide plungers 128 and 129 through the racks 133 and 134 and their associated spur gears. In this manner, the track 132 and all of the mechanism supported by it may be raised or lowered.

Mounted for movement along the track 132 are two sets of rollers 150 and 151, which are held in spaced relation one to another by a crossbar 152 fixed to downwardly extending projections 153 and 154, which extend downwardly from the sets of rollers 150 and 151. The projections 153 and 154 have chains 155 and 156 attached to them for supporting a stripper carrier designated generally by the numeral 157.

The stripper carrier 157 comprises a main framework 158 having extending downwardly from it a pair of locating pins 159 and 160 (Figs. 8, 9 and 12), which are adapted to pass through holes 161 and 162 in either the assembling section 21 or the assembling section 22 when the track 132 is lowered, handles 163 and 164 being provided on the main framework 158 for guiding the locating pins 159 and 160 into the holes in the assembling sections.

Extending downwardly from the framework 158 is a latch releasing pin 165, which is pointed, as shown at 166 (Figs. 7 and 8) to engage in aligned apertures 167 in the plates comprising the assembling sections 21 and 22 so that the edge of the latch releasing pin 165 will cam the lever 51 counter-clockwise to move the latch 50 out of engagement with the lower plate in the assembling sections and thus permit the plates to be separated in a manner to be described hereinafter.

Mounted on the framework 158 are a plurality of rods 171, which are fixed at their upper ends to gear segments 172 (Figs. 10 and 12). The gear segments are in mesh with a rack 173, which extends across the framework 158 and is slidable longitudinally of the framework, being normally urged to the position shown in Fig. 10 by a contractile spring 174, which is fixed to the rack and to a portion of the framework as shown at 175. The rack is provided with a handle 176, whereby it may be pushed to the right (Fig. 10) to rock the segments 172 in a clockwise direction against the action of the spring 174. When the rack 173 is thus moved to the right, the rods 171 will be rotated and since the rods 171 are each provided at their lower ends with a cross member 177, which is normally in alignment with the head of a forked member 178, the cross heads 177 will be rocked to a position at right angles to the head of the forked member 178. The upper portion of the forked member 178 has a central passage 179, in which the rod 171 is rotatable. Each of the forked members 178 is slidable in a passageway 180 (Fig. 12) formed in the framework 158 and has a rack 181 on its rear surface in mesh with a gear segment 182. The gear segments 182 are fixed to a shaft 183 which extends across the framework 158 and is journalled in bearings 184. Adjacent the middle of the framework 158, a gear segment 185 is fixed to the shaft 183 and is in mesh with a rack 186 attached to the lower end of a piston rod 187. The piston rod 187 (Figs. 8 and 11) is attached to a piston 188 slidable in a cylinder 189, which is mounted in any suitable manner on the framework 158. The cylinder 189 may be supplied with fluid under pressure from any suitable source through either a pipe 190 or a pipe 191 under control of a manually operable valve 192, which, when operated in one direction, will admit fluid through pipe 190 to the bottom of the cylinder and when reversed, will admit fluid to the top of the cylinder through pipe 191. The valve 192 may be of any suitable type, which, when manually operated, will admit fluid selectively either to the pipe 190 or the pipe 191 and when the fluid is admitted to the pipe 190 to raise the piston 193, fluid will be permitted to escape from the upper end of the cylinder 189 through the pipe 191. Thus, the operation of the rods 171 and forked member 178 may be jointly controlled by the valve 192 and the handle 176.

Since the downward movement of the forked member 178 will be prevented by the cross head 177 when the cross head is in alignment with the forked member, it is necessary for the operator operating the apparatus to hold the handle 176 with one hand while manipulating the valve 192 with the other hand. When the handle 176 is moved to the right after the forked member 178 and cross head 177 have been entered into apertures 195 (Figs. 1, 2, 13 and 14) in the plate 37, the cross head will be moved to position under a shoulder 196 formed on the plate 37. The plate 37 is cut out as shown at 197 to permit the rotation of the rod 171 and, after this operation has been performed, the valve 192 may be operated to cause the forked member 178 to move downwardly with respect to the rod 171. When this occurs, the cross heads 177 will hold the plate 37 in its upper position and the forked member 178 will push the plate 36 downwardly against the action of the springs 44 and 45 and to thereby strip the pins 55 from the assembled article in the assembling section 21.

A better understanding of the invention may be had by reference to the following brief description of the operation of the apparatus. A plurality of the carriers 20 may be provided and may be transported on belts similar to the belt 25 past a series of operators' stations, where the operators may assemble insulators 65 and their attached conducting members 66, together with holding plates 68 on the pins 55 and 56 to build up an assembly. As the assemblies are built up, either the right hand or left hand assembly may be suitably attached to the leads 100 running to the terminal strips 101 by placing a sub-assembly of an insulator 65 and its attached conducting members between the plate 99 and clamping plate 95 and after clamping the sub-assembly between the plates 90 and 95, oscillating the part to facilitate soldering of the leads 100 to the conducting members 66.

In the assembling operation, the post 85 may be transferred to the stud 82 at either end of the plate 37 and used in that position. After an assembly has been completed on the plate 37 and compressed by any suitable compressing means, the parts may be attached together by passing a bolt through the passage 69 formed by the aligned apertures in the various parts of the assembly and at the completion of the assembling and attachment of these parts, the assembling section 22 may be moved from the position shown in Fig. 5 to the position shown in Fig. 6, and parts may be assembled in the assembling section 22 in the same manner as described in the assembling section 21 since all of the details of this section are identically the same as the details of the section 21, the only difference being that the section 21 is mounted on the pins 42 and 43 so that it may be tipped to the position shown in dot and dash lines in Fig. 5, whereas the assembling section 22 is mounted on the pantograph arrangement including the levers 103 and 104. After the assemblies have been completed and attached together on the two assembling sections, it will be necessary to forcibly strip the assemblies from the pins 55 and 56.

As the carrier 20 moves along with the belt 25, it will arrive in the area of the stripping mechanism shown in Figs. 8 to 14 and an operator may grasp the handles 163 and 164 to guide the stripping mechanism to position, where the pins 159 and 160 are in alignment with the holes 161 and 162 on the assembling section 22 and while guiding the stripper carrier 157 with the handles 163 and 164, may operate two buttons 198 and 199, both of which must be operated to admit the fluid under pressure through the hose connection 43, thereby to drive the carrier downwardly. The provision of the two control buttons 198 and 199 necessitates an operator operating the mechanism to have both hands out of the path of the carrier and will prevent the operator from accidentally getting his hands in the way of any of the positively driven parts of the apparatus. After the stripper carrier 157 has been moved downwardly to a point where the cross head 177 of the rod 171 engages the upper surface of the cut-out 197, the push buttons 198 and 199 may be released and the operator may then, with his left hand, operate the handle 176 to rotate all of the cross heads 177 to a position where they will engage the shoulders 196 in the plate 37 or 39 and thereupon the operator, with his right hand, may operate the valve 192 to initiate the stripping operation.

When the valve 192 is operated, the piston 188 will be driven downwardly to rock shaft 183 counter-clockwise (Figs. 11 and 12) to move the forked members 178 downwardly while the cross heads 177 hold the plate 37 against movement. The forked members 178 will push the plate 36 down and draw the pins 55 and 56 out of the articles, as shown in Fig. 14. When the plate 36 reaches its lowermost position, it will be locked by the latches 75 and after the assembled articles are removed from the carrier 20, the latches 75 may be operated to restore the assembling sections to normal position. After the parts have thus been stripped from the assembling section at that time associated with the stripper carrier 157, the valve 192 may be operated to return the forked member 178 to its upper position and the handle 176 may then be released to permit the spring 174 to return the cross heads to position in alignment with the forked member 178. When the cross head 177 and forked member 178 have thus been restored to normal, the buttons 198 and 199 may then be again operated to cause fluid under pressure to be admitted through the hose connection 144 to the lower end of the cylinder 142, thereby to raise the track 132 and stripper carrier 157 out of association with the carrier 20. When the apparatus is thus restored to normal, the assembled parts may be removed from the assembling section 21 or 22, which had the parts stripped from it and the action repeated with the other assembling section. When the forked member 178 pushes the plate 36 downwardly, the plate will be locked under the spring pressed latches 75 and thus will remain in that position until the latches are manually operated, although the forked member 178 may be moved upwardly. After the just described operations have been performed, they may be repeated with respect to the other assembling section and the fixture will be restored to normal. It will be understood that the entire stripper carrier may be moved along with the carrier 20 as the carrier travels on the belt 23 so that the travel of the fixtures through the apparatus may be continuous.

What is claimed is:

1. The combination of a fixture including separable plates one of said plates provided with means for supporting articles during their assembly and the other plate being movable for stripping articles from said plate and said means, with stripping mechanism for moving said movable plate comprising a trackway adjacent said fixture, a stripper carrier supported by and movable along said trackway to a position to align said carried with said fixture, and means supported by said carrier for engaging and moving the movable plate of the fixture to strip articles from the fixture.

2. The combination of a fixture for supporting articles during their assembly including separable plates, one of which has article locating pins on it and the other one of which is movable for stripping articles from the locating pins, with stripping mechanism for moving said movable plate comprising a trackway adjacent said fixture, a stripper carrier supported by and movable along said trackway to a position to align the carrier with the fixture, and means supported by said carrier for engaging and moving the movable plate of the fixture to strip articles from the fixture by drawing the pins out of the articles.

3. The combination of a fixture for supporting articles during their assembly including superposed separable plates, the bottom one of which has article locating pins fixed to it and extending through the upper plate which is movable and forms a supporting base for the article, with stripping mechanism for moving said movable plate with respect to the plate having pins fixed to it to strip articles from the fixture comprising a trackway adjacent said fixture, a stripper carrier supported by and movable along said trackway to a position to align said carrier with said fixture, and means supported by said carrier for engaging and moving the movable plate of the fixture to strip articles from the fixture by drawing the pins out of the article.

4. An apparatus for separating separable plates of a fixture comprising a trackway adjacent the fixture, a carrier movable along said trackway to align said carrier with the fixture, means for raising and lowering the trackway to carry the carrier into and out of association with a fixture, and means on the carrier engageable with the separable plates to separate them.

5. An apparatus for stripping articles from a fixture composed of separable plates, one of which has pins on it for locating parts of the articles and the other of which is movable with respect to the plate having pins on it comprising a trackway positioned adjacent a fixture, a stripper carrier supported by said trackway and movable along said trackway to a position to align said stripper carrier with said fixture, means for raising and lowering said trackway, means on said carrier for engaging parts of said fixture, and power means carried by said carrier for driving the means engaging the fixture to engage said separable plates and move them relative one to another for stripping the articles from the pins.

6. An apparatus for separating separable plates of a fixture comprising a trackway adjacent said fixture, a carrier movable along said trackway to a position to align said carrier with said fixture, means for raising and lowering the trackway to carry the carrier into and out of association with a fixture, means on the carrier engageable with the separable plates to separate them, and power means on the carrier for actuating the means engageable with the separable plates.

7. An apparatus for separating separable plates of a fixture comprising a trackway positioned adjacent said fixture, a carrier movable along said trackway to a position to align the carrier with a fixture, means for raising and lowering the trackway to carry the carrier into and out of association with a fixture, a rotatable rod supported by said carrier and having a cross head thereon engageable with the underside of one of the separable plates, a reciprocable member associated with said rotatable member for engaging the other of said separable plates, and means for imparting relative movement to the rod and reciprocable member to separate the plates.

8. An apparatus for separating separable plates of a fixture comprising a trackway positioned adjacent the fixture, a carrier movable along said trackway to a position to align said carrier and said fixture, means for raising and lowering the trackway to carry the carrier into and out of association with a fixture, a plurality of rotatable rods supported by said carrier, means common to said rods for rotating them, a cross head on each rod engageable with the underside of one of the separable plates, a reciprocable member also supported by the carrier and engageable with the upper surface of the other of the separable plates, and means for reciprocating the reciprocable member to push the plate associated therewith downwardly while the cross heads hold the other plate in a predetermined position.

9. In an apparatus for separating the separable plates of a fixture, a plurality of forked reciprocable members having surfaces to engage one of the separable plates of a fixture, a plurality of rods each rotatable between the forked portions of a forked member, a cross head on each of said rods, common means for rotating said rods to move the cross heads to position to engage a surface of another of the separable plates of a fixture, and means operable to reciprocate the forked members relative to said rods separating the plates, said cross heads being normally positioned to block movement of the forked members.

10. An assembling fixture comprising a carrier, shiftable assembling sections on said carrier each comprising a pair of superposed plates, the lower plate having locating pins therein extending through the upper plate for locating parts of articles on the upper plate, and resilient means tending to hold the lower plate against the underside of the upper plate to hold the locating pins in position to receive parts comprising a pin attached to and extending downwardly from the upper plate through the lower plate, and spring means interposed between a portion of the pin and the underside of the lower plate.

11. An assembling fixture comprising a carrier, shiftable assembling sections on said carrier each comprising a pair of superposed plates, the lower plate having locating pins therein extending through the upper plate for locating parts of articles on the upper plate, and resilient means for urging the lower plate against the underside of the upper plate to hold the locating pins in position to receive parts, said lower plate being movable downwardly to strip the pins from articles and said resilient means including a pin fixed in the upper plate and extending through the lower plate, and a spring interposed between the undersurface of the lower plate and a portion of said pin.

12. An assembling fixture comprising a carrier, shiftable assembling sections on said carrier each comprising a pair of superposed plates, the lower plate having locating pins therein extending through the upper plate for locating parts of articles on the upper plate, resilient means tending to hold the lower plate against the underside of the upper plate to hold the locating pins in position to receive parts, said lower plate being movable downwardly to strip the pins from articles, and latching means for latching the lower plate in its downward position.

13. An assembling fixture comprising a carrier, shiftable assembling sections on said carrier each comprising a pair of superposed plates, the lower plate having locating pins therein extending through the upper plate for locating parts of articles on the upper plate, means tending to hold the lower plate against the underside of the upper plate to hold the locating pins in position to receive parts, said lower plate being movable downwardly to strip the pins from articles, and spring-pressed manually releasable latching means for latching the lower plate away from the upper plate.

EUGENE L. MALHIOT.